United States Patent
Jung et al.

(10) Patent No.: US 9,942,226 B2
(45) Date of Patent: Apr. 10, 2018

(54) NFC PACKAGE FOR STORING BIOMETRIC INFORMATION AND ELECTRONIC DEVICE

(71) Applicant: Samsung Electronics Co., Ltd., Suwon-si (KR)

(72) Inventors: Yong-Won Jung, Seoul (KR); Youn-Sung Chu, Hwaseong-si (KR)

(73) Assignee: SAMSUNG ELECTRONICS CO., LTD. (KR)

(*) Notice: Subject to any disclaimer, the term of this patent is extended or adjusted under 35 U.S.C. 154(b) by 194 days.

(21) Appl. No.: 14/955,442

(22) Filed: Dec. 1, 2015

(65) Prior Publication Data

US 2016/0164867 A1     Jun. 9, 2016

(30) Foreign Application Priority Data

Dec. 3, 2014 (KR) .................. 10-2014-0171856

(51) Int. Cl.
| | |
|---|---|
| *G06F 21/00* | (2013.01) |
| *H04L 29/06* | (2006.01) |
| *H04W 4/00* | (2018.01) |
| *H04W 12/02* | (2009.01) |

(52) U.S. Cl.
CPC ......... *H04L 63/0861* (2013.01); *H04W 4/008* (2013.01); *H04W 12/02* (2013.01)

(58) Field of Classification Search
CPC .......... G06F 21/32; G06F 21/43; G06F 21/44; H04L 63/0861; H04W 4/008; H04W 12/02; H04W 12/04; H04W 12/06; H04W 12/08
USPC .............. 713/168, 186; 726/4, 5, 9; 380/270
See application file for complete search history.

(56) References Cited

U.S. PATENT DOCUMENTS

| | | | | |
|---|---|---|---|---|
| 6,038,666 A * | 3/2000 | Hsu | ..................... | G07C 9/00087 380/285 |
| 6,041,410 A * | 3/2000 | Hsu | ..................... | G06K 9/00013 380/285 |
| 6,853,739 B2 * | 2/2005 | Kyle | ....................... | G06F 21/32 340/5.83 |
| 7,287,158 B2 * | 10/2007 | Futamura | .............. | H04L 9/3268 713/156 |
| 7,493,495 B2 * | 2/2009 | Klinger | ................... | G06F 21/32 713/186 |
| 7,949,881 B2 | 5/2011 | Imura | | |
| 8,074,880 B2 | 12/2011 | Brown et al. | | |
| 8,078,885 B2 * | 12/2011 | Jobmann | ............... | H04L 9/0866 713/159 |
| 8,279,182 B2 | 10/2012 | Kim et al. | | |

(Continued)

FOREIGN PATENT DOCUMENTS

| | | |
|---|---|---|
| KR | 20050099106 | 10/2005 |
| KR | 101148304 | 5/2012 |
| KR | 20140098872 | 8/2014 |

*Primary Examiner* — Hosuk Song
(74) *Attorney, Agent, or Firm* — Onello & Mello LLP

(57) ABSTRACT

An electronic device includes a biometric sensor configured to generate biometric data by sensing a biometric characteristic and to encrypt the biometric a near field communication (NFC) controller configured to perform a near field communication, and a secure storage device coupled to the NFC controller, and configured to receive the encrypted biometric data from the biometric sensor through an internal communications channel, which may include an application processor and the NFC controller, and to store the biometric data by decrypting the encrypted biometric data.

11 Claims, 15 Drawing Sheets

(56) References Cited

U.S. PATENT DOCUMENTS

| | | |
|---|---|---|
| 8,443,199 B2 | 5/2013 | Kim et al. |
| 8,490,874 B2 | 7/2013 | Brown et al. |
| 8,554,689 B2 | 10/2013 | Mardikar et al. |
| 8,782,775 B2 | 7/2014 | Fadell et al. |
| 8,994,498 B2 * | 3/2015 | Agrafioti ................ G06F 21/40 340/5.52 |
| 2009/0070593 A1 | 3/2009 | Boshra et al. |
| 2009/0169070 A1 | 7/2009 | Fadell |
| 2010/0272326 A1 | 10/2010 | Abe |
| 2011/0179284 A1 | 7/2011 | Suzuki et al. |
| 2012/0092127 A1 | 4/2012 | Ganapathi et al. |
| 2014/0013406 A1 | 1/2014 | Tremlet |
| 2014/0062658 A1 | 3/2014 | Vrijen et al. |
| 2014/0096222 A1 | 4/2014 | Colnot |
| 2014/0150104 A1 | 5/2014 | Bousquet et al. |
| 2014/0181959 A1 | 6/2014 | Li et al. |
| 2014/0210589 A1 | 7/2014 | Grace |
| 2016/0042356 A1 * | 2/2016 | Jakobson ......... G06Q 20/40145 705/21 |

* cited by examiner

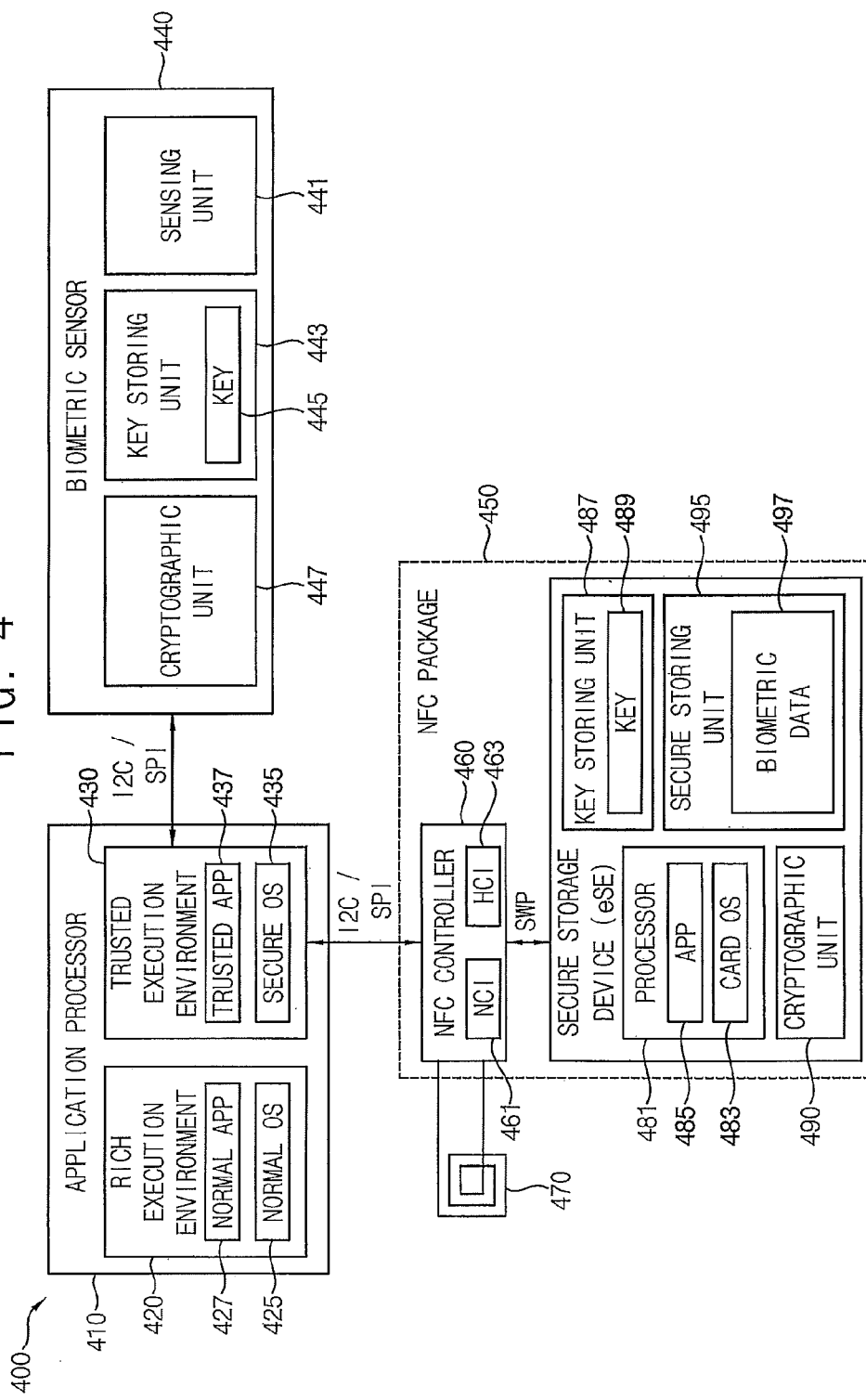

NFC PACKAGE FOR STORING BIOMETRIC INFORMATION AND ELECTRONIC DEVICE

CROSS-REFERENCE TO RELATED APPLICATIONS

This U.S. non-provisional application claims the benefit of priority under 35 U.S.C. § 119 to Korean Patent Application No. 10-2014-0171856 filed on Dec. 3, 2014 in the Korean Intellectual Property Office (KIPO), the entire contents of which are incorporated by reference herein in their entireties.

BACKGROUND

1. Technical Field

Exemplary embodiments relate generally to electronic devices and, more particularly, to near field communication (NFC) packages for storing biometric information and electronic devices including NFC packages.

2. Description of the Related Art

Recently, various functions for user convenience, security enhancement, etc. have been implemented in an electronic device, such as a smart phone, a tablet computer, a wearable device, etc., and biometric information is being used to improve these functions. For example, an electronic device may perform user authentication using biometric information, such as fingerprint information. Security for electronic payment by the electronic device may be strengthened using such biometric information, for example. In another example, an electronic device may measure biometric information, such as electrocardiogram information, heart rate information, etc., and, as a result, may provide a health care service to a user.

SUMMARY

Some exemplary embodiments provide an electronic device that securely stores biometric information.

Some exemplary embodiments provide a near field communication (NFC) package that securely stores biometric information.

According to exemplary embodiments, an electronic device includes a biometric sensor configured to generate biometric data by sensing a biometric characteristic, and to encrypt the biometric data, an application processor connected to the biometric sensor, and configured to control an operation of the electronic device, a near field communication (NFC) controller directly connected to the application processor and configured to perform a near field communication, and a secure storage device directly connected to the NFC controller such that the secure storage device receives encrypted biometric data from the biometric sensor through the application processor and the NFC controller. The secure storage device decrypts and stores the biometric data.

In some exemplary embodiments, the biometric sensor may be configured to store an encryption key and to encrypt the biometric data using the encryption key. The secure storage device may be configured to store a decryption key corresponding to the encryption key, and may decrypt the encrypted biometric data using the decryption key.

In some exemplary embodiments, the secure storage device may include a tamper-resistant function.

In some exemplary embodiments, the biometric sensor may include at least one of: a fingerprint sensor that senses fingerprint characteristics as the biometric data, a retina sensor that senses retina characteristics as the biometric data, an iris sensor that senses iris characteristics as the biometric data, a voice sensor that senses voice characteristics as the biometric data, an electrocardiogram sensor that senses heart functioning as the biometric data, a heart rate sensor that senses heart rate functioning as the biometric data, a blood pressure sensor that senses blood pressure as the biometric data, and a blood sugar sensor that senses a blood sugar level as the biometric data.

In some exemplary embodiments, the application processor may be configured to execute a normal operating system and a secure operating system. The secure operating system may be configured to receive encrypted biometric data from the biometric sensor and to transfer the encrypted biometric data to the NFC controller.

In some exemplary embodiments, the biometric sensor may include a sensing unit configured to generate biometric data by sensing biometric characteristics, a first key storing unit configured to store an encryption key, and a first cryptographic unit configured to encrypt the biometric data using the encryption key.

In some exemplary embodiments, the secure storage device may include a processor configured to control an operation of the secure storage device, a second key storing unit configured to store a decryption key corresponding to the encryption key, a second cryptographic unit configured to decrypt the encrypted biometric data using the decryption key, and a secure storing unit configured to store the biometric data.

In some exemplary embodiments, the biometric sensor may be configured to store a first encryption key and to encrypt the biometric data using the first encryption key. The application processor may be configured to store a first decryption key corresponding to the first encryption key and a second encryption key, to decrypt the encrypted biometric data using the first decryption key, to perform a predetermined operation on the biometric data, and to encrypt the biometric data upon which the predetermined operation is performed using the second encryption key. The secure storage device may be configured to store a second decryption key corresponding to the second encryption key, and may decrypt the encrypted biometric data using the second decryption key.

In some exemplary embodiments, the biometric sensor may be configured to store a first encryption key and a second encryption key. When the biometric data has a first security level, the biometric sensor may encrypt the biometric data using the first encryption key. When the biometric data has a second security level, the biometric sensor may encrypt the biometric data using the second encryption key.

In some exemplary embodiments, the application processor may be configured to store a second decryption key corresponding to the second encryption key, and a third encryption key. When the biometric data has the first security level, the application processor may be configured to transfer the encrypted biometric data to the NFC controller. When the biometric data has the second security level, the application processor may be configured to decrypt the encrypted biometric data using the second decryption key, to perform a predetermined operation on the biometric data, and to encrypt the biometric data upon which the predetermined operation is performed using the third encryption key.

In some exemplary embodiments, the secure storage device may be configured to store a first decryption key corresponding to the first encryption key, and a third decryption key corresponding to the third encryption key. When the biometric data has the first security level, the secure storage device may be configured to decrypt the encrypted biometric data using the first decryption key. When the biometric data has the second security level, the secure storage device may be configured to decrypt the encrypted biometric data using the third decryption key.

In some exemplary embodiments, the secure storage device may be configured to store registered biometric data. The secure storage device may be configured to obtain current biometric data by decrypting the encrypted biometric data received from the biometric sensor through the application processor and the NFC controller. The secure storage device may be configured to compare the current biometric data with the registered biometric data to perform user authentication.

In some exemplary embodiments, when the current biometric data matches the registered biometric data, the electronic device may be configured to perform an electronic payment, a unlock operation or a confidential application execution.

In some exemplary embodiments, the electronic device may be configured to transfer the biometric data stored in the secure storage device to a health care server.

According to exemplary embodiments, a near field communication (NFC) package includes an NFC controller directly connected to an application processor, and configured to perform near field communications, and a secure storage device directly connected to the NFC controller such that the secure storage device receives biometric data encrypted by a biometric sensor through the application processor and the NFC controller. The secure storage device is configured to decrypt and store the biometric data.

In exemplary embodiments in accordance with principles of inventive concepts an electronic device includes a biometric sensor configured to generate biometric data by sensing a biometric characteristic and to encrypt the biometric data; a near field communication controller configured to perform near field communications; and a secure storage device coupled to the near field controller and configured to receive encrypted biometric data from the biometric sensor through an internal communications channel from the near field communications controller, the secure storage device also configured to decrypt and store the biometric data.

In exemplary embodiments in accordance with principles of inventive concepts a biometric sensor includes an encryption key for encrypting the biometric data and the secure storage device includes a corresponding key for decrypting the biometric data.

In exemplary embodiments in accordance with principles of inventive concepts a secure storage device is configured to store authentication biometric data in nonvolatile memory.

In exemplary embodiments in accordance with principles of inventive concepts a portable electronic device includes an electronic device that includes a biometric sensor configured to generate biometric data by sensing a biometric characteristic and to encrypt the biometric data; a near field communication controller configured to perform near field communications; and a secure storage device coupled to the near field controller and configured to receive encrypted biometric data from the biometric sensor through an internal communications channel from the near field communications controller, the secure storage device also configured to decrypt and store the biometric data wherein the biometric sensor includes an encryption key for encrypting the biometric data and the secure storage device includes a corresponding key for decrypting the biometric data and a secure storage device configured to store authentication biometric data in nonvolatile memory.

In exemplary embodiments in accordance with principles of inventive concepts a watch includes an electronic device that includes a biometric sensor configured to generate biometric data by sensing a biometric characteristic and to encrypt the biometric data; a near field communication controller configured to perform near field communications; and a secure storage device coupled to the near field controller and configured to receive encrypted biometric data from the biometric sensor through an internal communications channel from the near field communications controller, the secure storage device also configured to decrypt and store the biometric data wherein the biometric sensor includes an encryption key for encrypting the biometric data and the secure storage device includes a corresponding key for decrypting the biometric data and a secure storage device configured to store authentication biometric data in nonvolatile memory.

The NFC package and the electronic device according to exemplary embodiments may securely store the biometric data in the secure storage device of which security is ensured, thereby enhancing security for the biometric data. Further, since the biometric data is encrypted by the biometric sensor, and then transferred to the secure storage device, the security for the biometric data may be further strengthened.

BRIEF DESCRIPTION OF THE DRAWINGS

Illustrative, non-limiting exemplary embodiments will be more clearly understood from the following detailed description taken in conjunction with the accompanying drawings.

FIG. 4 is a block diagram illustrating an electronic device according to exemplary embodiments.

DETAILED DESCRIPTION OF THE EMBODIMENTS

Figure 1:
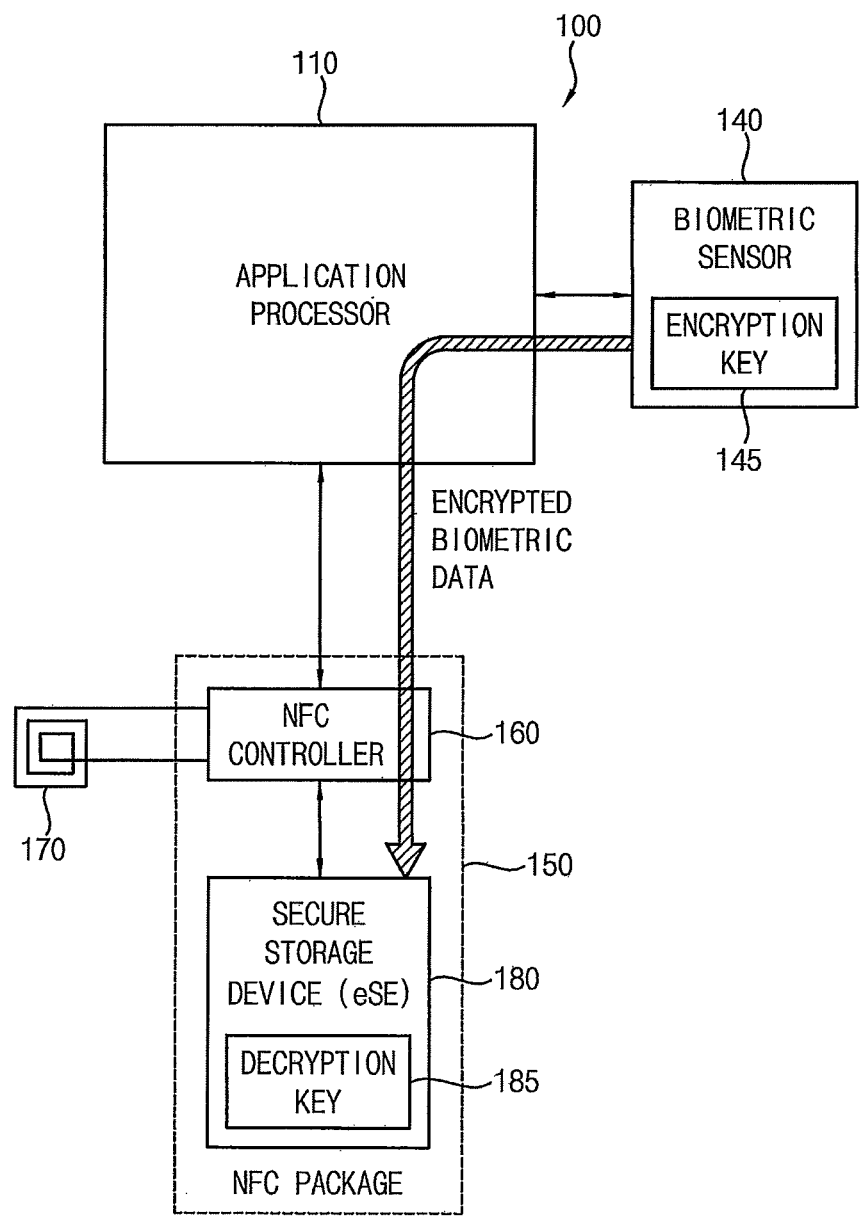
FIG. 1 is a block diagram illustrating an electronic device according to exemplary embodiments.

Various exemplary embodiments will be described more fully hereinafter with reference to the accompanying drawings, in which some exemplary embodiments are shown. Inventive concepts may, however, be embodied in many different forms and should not be construed as limited to the exemplary embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In accordance with principles of inventive concepts, a biometric sensor senses a biometric characteristic of a user (or other) and encrypts the biometric data obtained through the sensing operation. The biometric sensor may store an encryption key for encrypting sensed biometric data. The biometric sensor may transfer the encrypted biometric data to a near-field-communications device, or module, which may include a near field communications controller and a secure storage device. The transfer to the near field communications controller may be through an application processor, which may not have access to a decryption key for and may not decrypt the encrypted biometric data. When received by the near field communications device, the encrypted data may be decrypted, using a decryption key stored in the near-field-communications device. After decrypting the biometric data the near-field-communications device may store the decrypted biometric data in tamper resistant secure storage. The near field communications controller may selectively provide data from the secure storage device or application processor to an external near field communications device.

In exemplary embodiments, an application processor may include both a normal operating system (to provide, for example, a rich execution environment) and a secure operating system (to provide, for example, a secure execution environment). In such exemplary embodiments, the application processor may employ the secure operating system to decrypt the sensed biometric data.

A user's biometric data, which may be referred to herein as registration or authentication biometric data, may be stored in nonvolatile storage for comparison with newly-obtained, or current, biometric data for identification and security purposes. Current data that has been compared with registration data and has been identified as being associated with the appropriate user may be referred to herein as authenticated biometric data. Biometric data associated with an appropriate user may also be employed locally, or in conjunction with a health care server, to monitor the health and activities of a user, for example.

Figure 2:
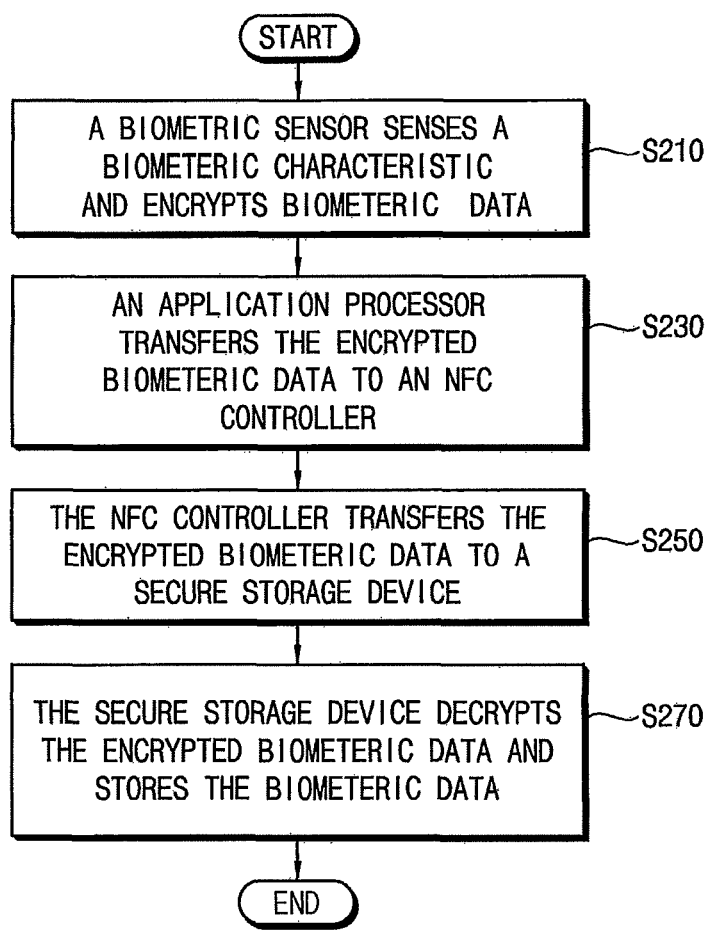
FIG. 2 is a flow chart illustrating a method of storing biometric information in an electronic device according to exemplary embodiments.
Figure 3:
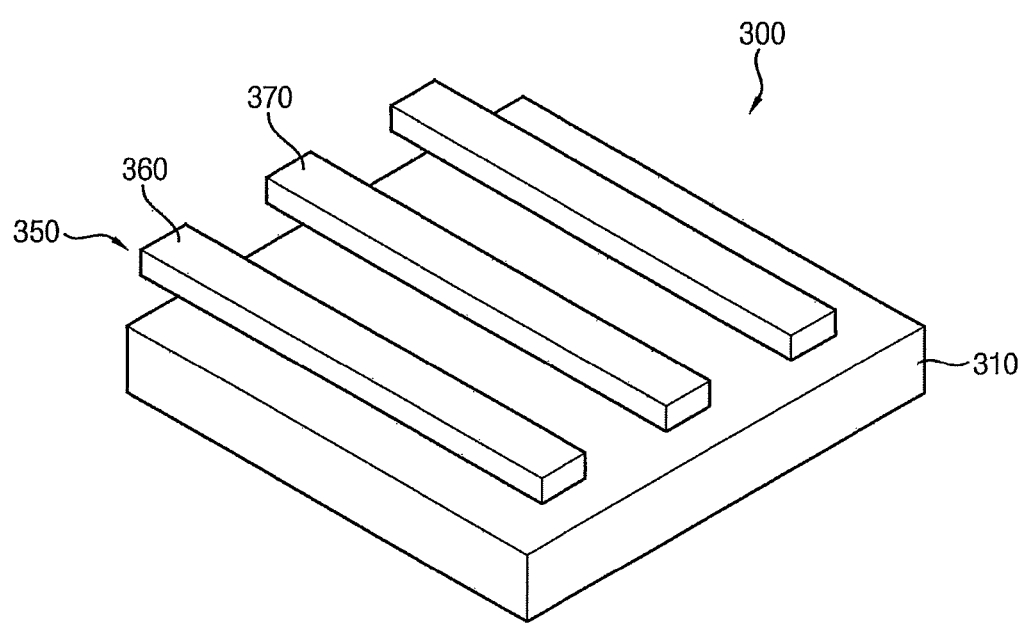
FIG. 3 is a diagram for describing an exemplary of a secure storage device having a tamper-resistant function.

FIG. 1 is a block diagram illustrating an electronic device according to exemplary embodiments, FIG. 2 is a flow chart illustrating a method of storing biometric information in an electronic device according to exemplary embodiments, and FIG. 3 is a diagram for describing an example of a secure storage device having a tamper-resistant function.

Referring to FIG. 1, an electronic device 100 includes an application processor 110, a biometric sensor 140, a near field communication (NFC) controller 160 and a secure storage device 180. In exemplary embodiments in accordance with principles of inventive concepts, the electronic device may be any portable or mobile electronic device, such as a cellular phone, a smart phone, a tablet computer, a wearable device, a smart watch, smart glasses, a laptop computer, a personal digital assistant (PDA), a portable multimedia player (PMP), a digital camera, a music player, a portable game console, a navigation device, for example The application processor 110 may control overall operation of the electronic device 100. For example, the application processor 110 may execute predetermined applications to provide various services. In some exemplary embodiments, the application processor 110 may execute a normal operating system (OS) to provide a rich execution environment (REE), and may execute a secure OS to provide a trusted execution environment (TEE). For example, normal applications, such as an internet browser, a game application, a video application, etc., may be executed by the normal OS in the REE. Applications requiring security, such as an electronic payment application, a screen lock application, a confidential application, etc., may be previously designated as a trusted application, and may be executed by the secure OS in the TEE. In exemplary embodiments, normal applications executed in the REE may exchange data or a context with the trusted applications executed in the TEE only via a predetermined monitor module in the TEE. Accordingly, the TEE may be secured against attacks (for example, software attacks) or hacking from the REE.

The biometric sensor 140 may be connected to the application processor 110, and may be controlled by the application processor 110. In some exemplary embodiments, the biometric sensor 140 may be controlled by the secure OS (for example, a device driver or a trusted application executed by the secure OS) executed in the TEE. In such exemplary embodiments, because the biometric sensor 140 is controlled in the TEE, security for the biometric sensor 140 may be enhanced.

The biometric sensor 140 may generate biometric data representing a biometric characteristic by sensing the biometric characteristic. According to exemplary embodiments, the biometric data generated by the biometric sensor 140 may be used for user authentication, or may be used to provide a health care service, for example. Biometric sensor 140 may include at least one of: a fingerprint sensor that senses fingerprint characteristics as the biometric data, a retina sensor that senses retina characteristics as the biometric data, an iris sensor that senses iris characteristics as the biometric data, a voice sensor that senses voice characteristics as the biometric data, an electrocardiogram sensor that senses heart functioning as the biometric data, a heart rate sensor that senses heart rate functioning as the biometric data, a blood pressure sensor that senses blood pressure as the biometric data, and a blood sugar sensor that senses a blood sugar level as the biometric data, for example.

The biometric sensor 140 may encrypt the biometric data. For example, the biometric sensor 140 may store an encryption key 145 that is unique to the electronic device 100, and may encrypt the biometric data using the stored encryption key 145. The encrypted biometric data that is encrypted by the biometric sensor 140 may be transferred to the secure storage device 180 through the application processor 110 and the NFC controller 160. Accordingly, because the biometric data is transferred in an encrypted state from the biometric sensor 140 to the secure storage device 180, security for the biometric data may be further strengthened.

The NFC controller 160 may be directly connected to the application processor 110, and may be controlled by the application processor 110. In some exemplary embodiments, the NFC controller 160 may be controlled by the secure OS (for example, a device driver or a trusted application executed by the secure OS) executed in the TEE. In such exemplary embodiments, because the NFC controller 160 is controlled in the TEE, the security for the NFC controller 160 may be enhanced.

The NFC controller 160 may be further connected to an NFC antenna 170, and may perform a near field communication through the NFC antenna 170. The NFC controller 160 may perform a data path control operation that transfers data provided from the application processor 110 (or the secure storage device 180) selectively to an external NFC device through the NFC antenna 170 or to the secure storage device 180 (or the application processor 110), for example.

The NFC controller 160 may receive the encrypted biometric data from the biometric sensor 140 through the application processor 110, and may transfer the encrypted biometric data to the secure storage device 180.

The secure storage device 180 may be directly connected to the NFC controller. In some exemplary embodiments, data stored in the secure storage device 180 may be read by the NFC controller 160, and the read data may be provided to the external NFC device through the NFC antenna 170. In this manner, in accordance with principles of inventive concepts, the secure storage device 180 may store data used in the near field communication. In some exemplary embodiments, the secure storage device 180 may be an embedded secure element (eSE) installed within the electronic device 100.

The secure storage device 180 may have a tamper-resistant function. For example, the secure storage device 180 may be tamper-resistant against tampering attacks, such as micro-probing, a software attack, eavesdropping, a fault generation attack, etc. In some exemplary embodiments, to have the tamper-resistant function, the secure storage device 180 may include a fault detector, a power glitch detector, a laser detector, an abnormal condition detector, a reset detector, a metal shield, a data path encryption, or a true random number generator, for example. As illustrated in FIG. 3, the secure storage device 180 may include a substrate 310 and at least one metal layer 350. The secure storage device 180 may detect tampering attacks by sensing a change of a capacitance between two metal lines 360 and 370 included in the at least one metal layer 350, for example.

The secure storage device 180 may be directly connected to the NFC controller 160 such that the secure storage device 180 receives the encrypted biometric data from the biometric sensor 140 through the application processor 110 and the NFC controller 160. Further, the secure storage device 180 may store the biometric data by decrypting the encrypted biometric data. For example, the secure storage device 180 may store a decryption key 185 corresponding to the encryption key 145 stored in the biometric sensor 140, and may decrypt the encrypted biometric data using the decryption key 185. In some exemplary embodiments, the encryption key 145 and the decryption key 185 may be symmetric keys, and may be the same key. In other exemplary embodiments, the encryption key 145 and the decryption key 185 may be asymmetric keys, and may be a pair of keys.

In some exemplary embodiments, the NFC controller 160 and the secure storage device 180 may be implemented as one NFC package 150 (or one NFC chip). For example, the NFC controller 160 and the secure storage device 180 may be packaged as a system in package (SIP). In other exemplary embodiments, the NFC controller 160 and the secure storage device 180 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP), for example.

As described above, in the electronic device 100 according to exemplary embodiments, the biometric data is stored in the secure storage device 180 having the tamper-resistant function. Accordingly, the security for the biometric data (or the biometric information) may be enhanced. Further, in the electronic device 100 according to exemplary embodiments, the biometric data is encrypted by the biometric sensor 140, and may be transferred in an encrypted state to the secure storage device 180. Accordingly, because the biometric data is transferred in the encrypted state from the biometric sensor 140 through the application processor 110 and the NFC controller 160 to the secure storage device 180, the security for the biometric data (or the biometric information) may be further strengthened.

Although FIG. 1 illustrates an exemplary embodiment in which the secure storage device 180 receives the encrypted biometric data through the application processor 110 and the NFC controller 460, in some exemplary embodiments, the secure storage device 180 may be directly connected to the biometric sensor 140 and may directly receive the encrypted biometric data from the biometric sensor 140.

Hereinafter, a method of storing the biometric information in the electronic device 100 according to exemplary embodiments will be described with reference to FIGS. 1 through 3.

Referring to FIGS. 1 and 2, the biometric sensor 140 may generate biometric data by sensing the biometric information (more particularly, by sensing biometric functions, features, or characteristics, such as a person's fingerprint, heart rate, or iris characteristics, for example, all of which (functions, features, characteristics) may be referred to herein, simply, as biometric characteristics), and may encrypt the biometric data (S210). For example, the biometric sensor 140 may store the encryption key 145, and may encrypt the biometric data using the encryption key 145.

The application processor 110 may receive the encrypted biometric data from the biometric sensor 140, and may transfer the received encrypted biometric data, as it is (that is, still encrypted), to the NFC controller 160 without performing an additional operation or process (S230). In some exemplary embodiments, the application processor 110 may execute the normal OS and the secure OS, and the secure OS executed by the application processor 110 may transfer the encrypted biometric data from the biometric sensor 140 to the NFC controller 160. Accordingly, because the transfer of the encrypted biometric data is performed in the TEE, the security for the biometric data may be enhanced.

The NFC controller 160 may receive the encrypted biometric data from the application processor 110, and may transfer the received encrypted biometric data, as it is (that is, still encrypted), to the secure storage device 180 (S250).

The secure storage device 180 may receive the encrypted biometric data from the NFC controller 160, and may store the biometric data by decrypting the encrypted biometric data (S270). For example, the secure storage device 180 may store the decryption key 185 (for example, the same key as the encryption key 145, or the key that is paired with the encryption key 145) corresponding to the encryption key 145 stored in the biometric sensor 140, and may decrypt the encrypted biometric data using the decryption key 185.

In a conventional electronic device, biometric data is typically stored in a host nonvolatile memory that is directly connected to an application processor. Thus, if the application processor or the host nonvolatile memory is hacked, the biometric data may be accessed. In contrast, in the electronic device 100 according to exemplary embodiments, because the biometric data is stored in the secure storage device 180 having a tamper-resistant function, the security for the biometric data may be enhanced. Additionally, in a conventional electronic device, a biometric sensor does not encrypt the biometric data, and the biometric data is output in an unencrypted state from the biometric sensor. In contrast, in the electronic device 100 according to exemplary embodiments, because the biometric data is encrypted by the biometric sensor 140 and is transferred in the encrypted state to the secure storage device 180, security for the biometric data may be further strengthened.

Figure 5A:
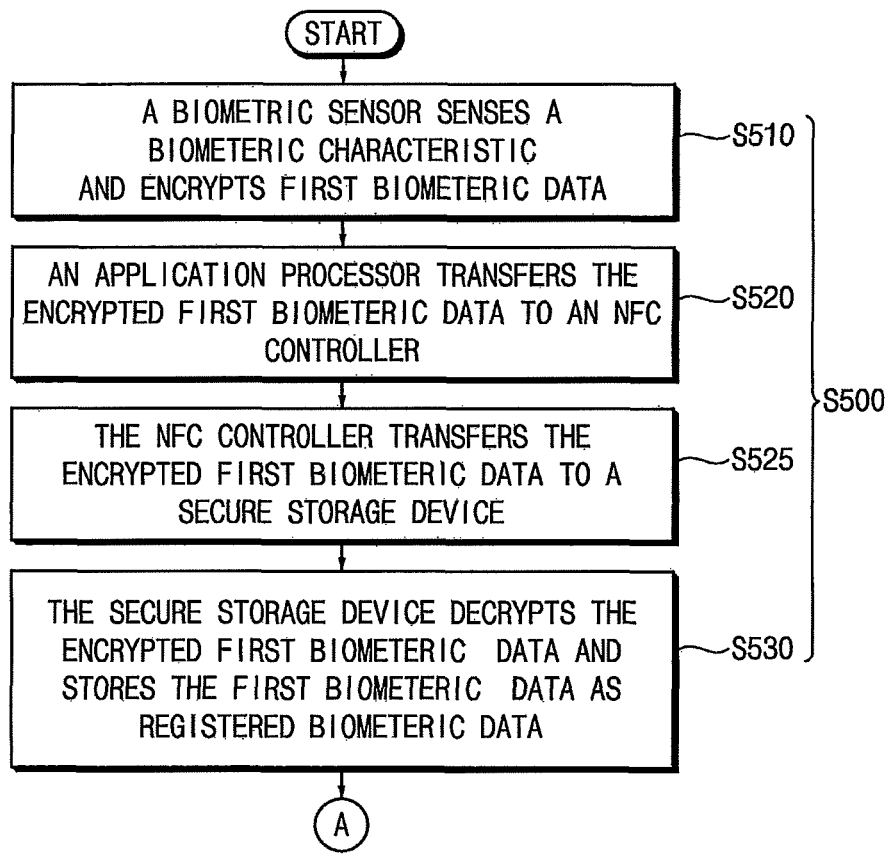
FIGS. 5A and 5B are a flow chart illustrating a method of operating an electronic device of FIG. 4 according to exemplary embodiments.
Figure 5B:
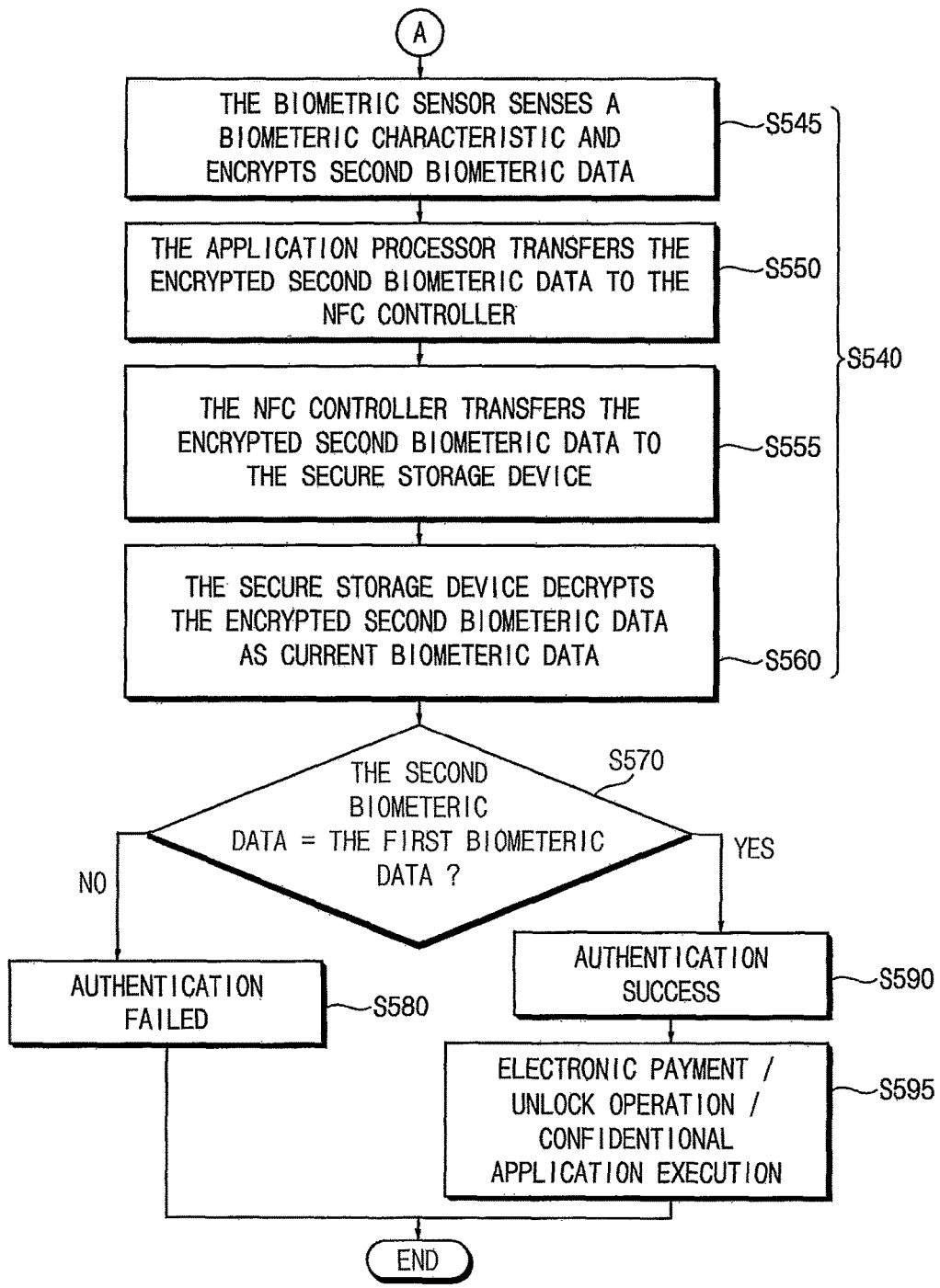
Figure 6:
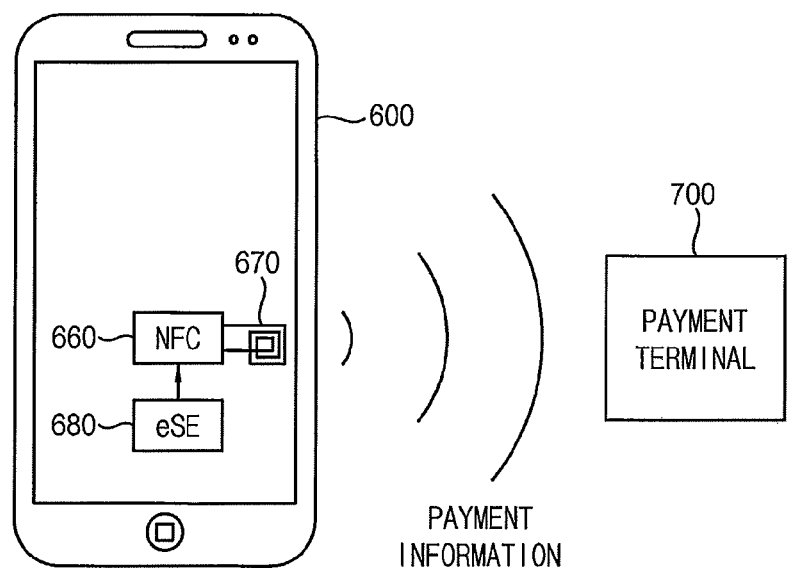
FIG. 6 is a diagram for describing an example where an electronic device of FIG. 4 performs electronic payment.
Figure 7:
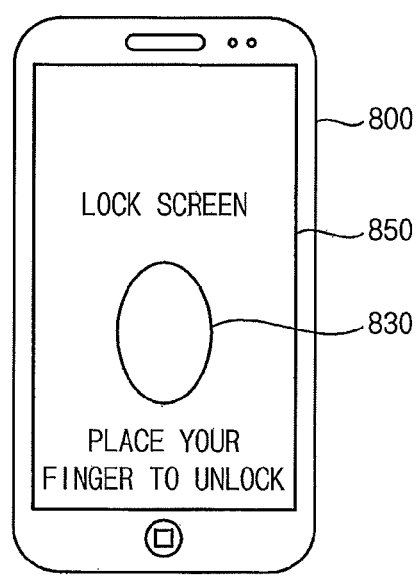
FIG. 7 is a diagram for describing an example where an electronic device of FIG. 4 performs a unlock operation.
Figure 8:
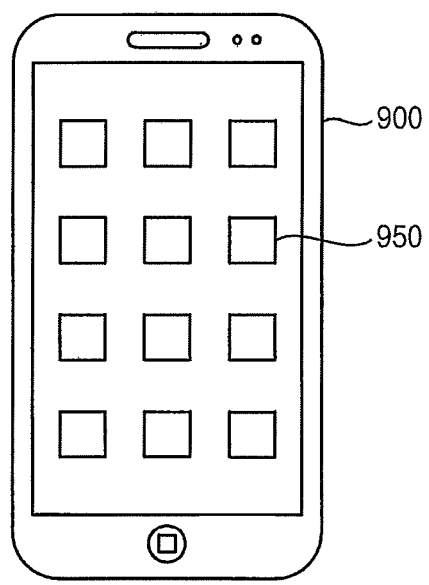
FIG. 8 is a diagram for describing an example where an electronic device of FIG. 4 executes a confidential application.

FIG. 4 is a block diagram illustrating an electronic device according to exemplary embodiments, FIG. 5 is a flow chart illustrating an exemplary method of operating an electronic device such as the exemplary embodiment of FIG. 4 according to exemplary embodiments, FIG. 6 is a diagram for describing an exemplary process whereby an electronic device such as the exemplary embodiment of FIG. 4 performs electronic payment, FIG. 7 is a diagram for describing an exemplary process whereby an electronic device such as the exemplary embodiment of FIG. 4 performs a unlock operation, and FIG. 8 is a diagram for describing an exemplary process whereby an electronic device such as the exemplary embodiment of FIG. 4 executes a confidential application.

Referring to FIG. 4, an electronic device 400 includes an application processor 410 that controls overall operation of the electronic device 400, a biometric sensor 440 that senses a biometric characteristic, an NFC controller 460 that performs a near field communication, and a secure storage device 480 connected to the NFC controller 460.

To provide a rich execution environment (REE) 420 and a trusted execution environment (TEE) 430, the application processor 410 may execute a normal OS 425 in the REE 420, and may execute a secure OS 435 in the TEE 430. A normal application 425 may be executed by the normal OS 425 in the REE 420. A normal application 425 may include an internet browser, a game application, or a video application, for example. A trusted application 437 may be executed by the secure OS 435 in the TEE 430. A trusted application 437 may include an electronic payment application, a screen lock application, or a confidential application, for example. Data or context exchange between the REE 420 and the TEE 430 may be performed only via a predetermined monitor module, and, as a result, the TEE 430 may be secured against attacks (for example, software attacks) or hacking from (or via) the REE 420.

The biometric sensor 440 may be connected to the application processor 410. In some exemplary embodiments, the biometric sensor 440 may be connected to the application processor 410 through an inter-integrated circuit (I2C) interface or a serial peripheral interface (SPI), for example. The biometric sensor 440 may be controlled in the TEE 430, and, as a result, the security for the biometric sensor 440 may be enhanced.

The biometric sensor 440 may include a sensing unit 441, a first key storing unit 443 and a first cryptographic unit 447. The sensing unit 441 may generate biometric data by sensing the biometric characteristic. Biometric characteristics (for example, fingerprint patterns or iris patterns) and characteristics of biological functions (for example, heart rate or blood pressure) may be referred to herein as biometric characteristics, as sensed biometric information, or as biometric data. In exemplary embodiments in accordance with principles of inventive concepts, the sensing unit 441 may sense, as the biometric data, fingerprint information (or characteristics), retina information (or characteristics), iris information (or characteristics), voice information (or characteristics), electrocardiogram information (or characteristics), heart rate information(or characteristics), blood pressure information (or characteristics), or blood sugar information (or characteristics), for example. The first key storing unit 443 may store an encryption key 445, and the first cryptographic unit 447 may encrypt the biometric data using the encryption key 445 stored in the first key storing unit 443. Because the biometric sensor 440 encrypts the biometric data using the encryption key 445, the biometric data or the biometric information may not be leaked even if the encrypted biometric data output from the biometric sensor 440 is monitored by a hacker.

In exemplary embodiments in accordance with principles of inventive concepts, NFC controller 460 may be connected to the application processor 410. In some exemplary embodiments, the NFC controller 460 may be connected to the application processor 410 through an I2C interface or a SPI. The NFC controller 460 may be controlled in the TEE 430, and, as a result, the security for the NFC controller 460 may be enhanced, The NFC controller 460 may be further connected to an NFC antenna 470, and may perform a near field communication with an external NFC device through the NFC antenna 470. In some exemplary embodiments, the NFC controller 460 may include an NFC controller interface (NCI) 461 for interfacing with the application processor 410, and a host controller interface (HCI) 463 for interfacing with the secure storage device 480. The NFC controller 460 may perform a data path control operation for data received from the application processor 410, the secure storage device 480 or the NFC antenna 470.

The secure storage device 480 may be connected to the NFC controller 460. In some exemplary embodiments, the secure storage device 480 may be connected to the NFC controller 460 through a single wire protocol (SWP). Additionally, in some exemplary embodiments, the secure storage device 480 may be an embedded secure element (eSE) installed within the electronic device 400.

The secure storage device 480 may include a processor 481, a second key storing unit 487, a second cryptographic unit 490 and a secure storing unit 495. The processor 481 may control overall operation of the secure storage device 480. In some exemplary embodiments, the processor 481 may execute a card OS 483 for operating the secure storage device 480, and may additionally execute an application (or an applet) to provide a predetermined service. The second key storing unit 487 may store a decryption key 489 (for example, the same key as the encryption key 445, or the key that is paired with the encryption key 445) corresponding to the encryption key 445 stored in the biometric sensor 440.

The second cryptographic unit 490 may decrypt the encrypted biometric data received from the biometric sensor 440 through the application processor 410 and the NFC controller 460 using the decryption key 489 stored in the second key storing unit 487. The original biometric data 497, also referred to herein as registered or authenticated biometric data, recovered by the second cryptographic unit 490 may be stored in the secure storing unit 495. The original, registered, authenticated biometric data may be biometric data associated with a user that may be used to identify a user by comparing the original biometric data to currently-sensed, or, simply, current biometric data, for example. In some exemplary embodiments, the second key storing unit 487 and the secure storing unit 495 may be implemented using a single nonvolatile memory. In other exemplary embodiments, the second key storing unit 487 and the secure storing unit 495 may be implemented using different nonvolatile memories.

Although a conventional secure storage device may store data used in the near field communication a, secure storage device 480 according to exemplary embodiments may, additionally, store biometric data 497. Because the biometric data 497 is stored in the secure storage device 480 (which is ensured to be secure) having the tamper-resistant function, the security for the biometric data may be enhanced. Additionally, in accordance with principles of inventive concepts, biometric data may be encrypted by the biometric sensor 440 and may be transferred in the encrypted state to the secure storage device 480. Accordingly, because the biometric data is transferred in the encrypted state between the biometric sensor 440 and the secure storage device 480, security for the biometric data may be further strengthened.

In some exemplary embodiments, the NFC controller 460 and the secure storage device 480 may be implemented as one NFC package 450 (or one NFC chip). For example, the NFC controller 460 and the secure storage device 480 may be packaged as a system in package (SIP).

Hereinafter, an exemplary method of operating an electronic device in accordance with principles of inventive concepts, such as electronic device 400 will be described below with reference to FIGS. 4 through 8.

Referring to FIGS. 4 and 5, to register biometric data or information (for example, fingerprint information, retina information, iris information, voice information, etc.) of a user, the electronic device 400 may store first biometric data in the secure storage device 480 (S500). In exemplary embodiments in accordance with principles of inventive concepts, the sensing unit 441 of the biometric sensor 440 may generate the first biometric data by sensing the biometric characteristic of the user, and the first cryptographic unit 447 of the biometric sensor 440 may encrypt the first biometric data using the encryption key 445 stored in the first key storing unit 443 of the biometric sensor 440 (S510). The application processor 410 may receive the encrypted first biometric data from the biometric sensor 440 using the secure OS 435, and may transfer the encrypted first biometric data, as it is (that is, still encrypted), to the NFC controller 460 (S520). The NFC controller 460 may receive the encrypted first biometric data from the application processor 410, and may transfer the encrypted first biometric data, as it is (that is, still encrypted), to the secure storage device 480 (S525). The secure storage device 480 may receive the encrypted first biometric data from the NFC controller 460. The second cryptographic unit 490 of the secure storage device 480 may decrypt the encrypted first biometric data using the decryption key 489 stored in the second key storing unit 487 of the secure storage device 480, and the secure storing unit 495 of the secure storage device 480 may store the original first biometric data as registered biometric data (S530). In some exemplary embodiments, this biometric data (or information) registration may be independently performed for respective users of the electronic device 400.

In exemplary embodiments in accordance with principles of inventive concepts, electronic device 400 may compare current biometric data with registered biometric data to perform user authentication (S540 and S570), for example. When user authentication is required, the biometric sensor 440 may generate second biometric data, or, simply, comparison biometric data, by sensing the biometric characteristic of a user, and may encrypt the second biometric data using the encryption key 445 (S545). The application processor 410 may transfer the encrypted second biometric data, as it is (that is, still encrypted), from the biometric sensor 440 to the NFC controller 460 (S550). The NFC controller 460 may transfer the encrypted second biometric data, as it is (that is, still encrypted), from the application processor 410 to the secure storage device 480 (S555). The secure storage device 480 may receive the encrypted second biometric data from the NFC controller 460, and may decrypt the encrypted second biometric data using the decryption key 489 (S560). The secure storage device 480 may perform the user authentication by comparing the second biometric data, that is, the current biometric data or, simply, comparison biometric data, with the first biometric data that is the registered biometric data (S570). According to exemplary embodiments, the result of the comparison (or, in this exemplary embodiment, the result of the user authentication) may be provided to an application 485 executed in the secure storage device 480, the trusted application 473 executed in the TEE 430, and/or the biometric sensor 440. When the second biometric data does not match the first biometric data (S570: NO), this may mean that the user authentication failed (S580) and, in such an event, the electronic device 400 may block subsequent processes for the unauthorized user.

In situations where the second biometric data does match the first biometric data (S570: YES), this may mean that the user authentication is successful (S590). In such an event, the electronic device 400 may be allowed to perform a subsequent process, such as electronic payment, a unlock operation or a confidential application execution (S595), for example. In some exemplary embodiments, as illustrated in FIG. 6, if the user authentication is successful, the electronic device 600 may perform an electronic payment, for example. In such a case, payment information (for example, credit card information) stored in the secure storage device 680 may be read by the NFC controller 660, and the NFC controller 660 may transmit the read payment information to an external payment terminal 700 through the NFC antenna 670, for example. The payment terminal 700 may process the electronic payment based on the payment information provided from the electronic device 600 through the near field communication. In other exemplary embodiments, if the user authentication is successful, the electronic device 400 may perform the electronic payment by providing the payment information through a wireless LAN communication, a Wi-Fi communication, a cellular phone communication, or the like. In still other exemplary embodiments, as illustrated in FIG. 7, if the user authentication is successful, the electronic device 800 may perform an unlock operation. For example, the electronic device 800 may sense fingerprint information of a user at a predetermined region 830 of a lock screen 850, and may perform an unlock operation when the sensed fingerprint information matches registered fingerprint information. In still other exemplary embodiments, as illustrated in FIG. 8, when a user clicks an icon 950 for a private or confidential application among icons displayed by the electronic device 900, the electronic device 900 may perform the user authentication using the sensed biometric information; the private or confidential application may be executed only when the user authentication using the biometric information is successful.

As described above, the electronic device 400 according to exemplary embodiments may perform a user authentication based on a biometric information comparison and may perform a subsequent process, such as an electronic payment, an unlock operation or a confidential application execution, only when the user authentication is successful. In this manner, security for the electronic device 400 may be enhanced in accordance with principles of inventive concepts.

Figure 9:
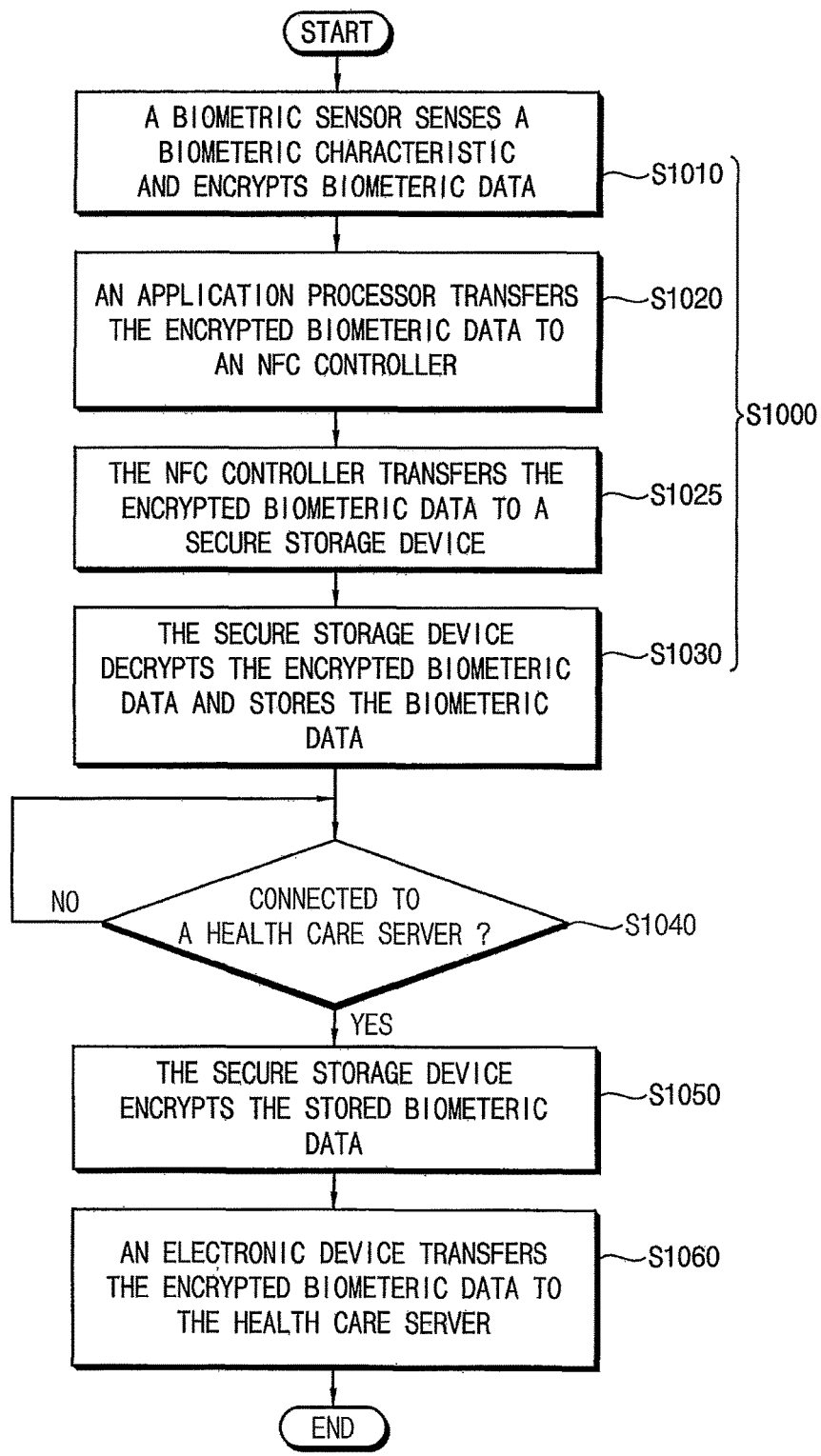
FIG. 9 is a flow chart illustrating a method of operating an electronic device of FIG. 4 according to exemplary embodiments.
Figure 10:
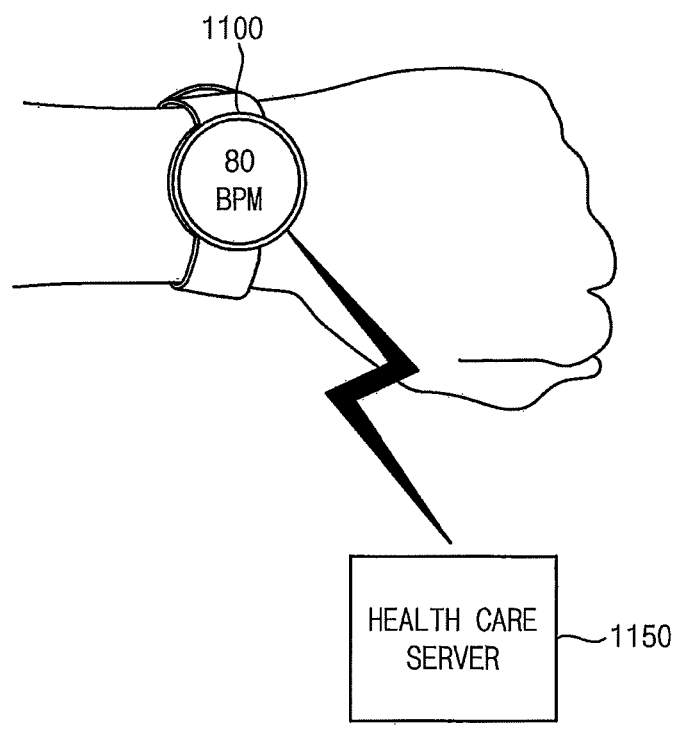
FIG. 10 is a diagram for describing an example where an electronic device of FIG. 4 transfers biometric information to a health care server.

FIG. 9 is a flow chart illustrating a method of operating an electronic device of FIG. 4 according to exemplary embodiments, and FIG. 10 is a diagram for describing an exemplary process in accordance with principles of inventive concepts employing an electronic device such as that of FIG. 4 transfers biometric information to a health care server.

Referring to FIGS. 4 and 9, an electronic device 400 may store biometric information (for example, electrocardiogram information, heart rate information, blood pressure information, and blood sugar information) of a user (S1000). For example, a sensing unit 441 of a biometric sensor 440 may generate biometric data by sensing a biometric characteristic of the user, and a first cryptographic unit 447 of the biometric sensor 440 may encrypt the biometric data using an encryption key 445 stored in a first key storing unit 443 of the biometric sensor 440 (S1010). An application processor 410 may receive the encrypted biometric data from the biometric sensor 440 using a secure OS 435, and may transfer the encrypted biometric data, as it is (that is, still encrypted), to an NFC controller 460 (S1020). The NFC controller 460 may receive the encrypted biometric data from the application processor 410, and may transfer the encrypted biometric data, as it is (that is, still encrypted), to a secure storage device 480 (S1025). The secure storage device 480 may receive the encrypted biometric data from the NFC controller 460. A second cryptographic unit 490 of the secure storage device 480 may decrypt the encrypted biometric data using a decryption key 489 stored in a second key storing unit 487 of the secure storage device 480, and a secure storing unit 495 of the secure storage device 480 may store the original biometric data 497 (S1030). As described above, in accordance with principles of inventive concepts, the private, sensitive or confidential biometric data (or information) may be transferred in an encrypted state to the secure storage device 480, and may be stored in the secure storage device 480 that is ensured to be secured, thereby enhancing the security for the biometric data.

In some exemplary embodiments, to provide a health care service to the user, the electronic device 400 may transfer the biometric data 497 about the biometric information (for example, the electrocardiogram information, the heart rate information, the blood pressure information, the blood sugar information, etc.) to an external health care server. For example, as illustrated in FIG. 10, the electronic device 100, such as a wearable device, may sense the biometric information, such as the heart rate information, and may transfer the biometric information to the external health care server 1150 to provide a diagnosis service or a health care service to the user, or use the biometric information locally, to display or process for local analysis and application. To provide these services, when the electronic device 1100 is not connected to the health care server 1150 (S1040: NO), the electronic device 1100 may wait for the connection to the health care server 1150. When the electronic device 1100 is connected to the health care server 1150 (S1040: YES), the second cryptographic unit 490 of the secure storage device 480 may encrypt the biometric data 497 stored in the secure storing unit 495 (S1050), and may provide the encrypted biometric data to a trusted application 437 executed in the TEE 430. The trusted application 437 may provide the encrypted biometric data to the health care server 1150 using, for example, a wireless communication (for example, a wireless LAN communication, a Wi-Fi communication, a cellular phone communication, etc.) (S1060).

As described above, the electronic device 400 according to exemplary embodiments may store the biometric information while maintaining the security of the biometric information for the health care service. Additionally, the electronic device 400 according to exemplary embodiments may provide the stored biometric information to the external health care server to provide improved health care service.

Figure 11:
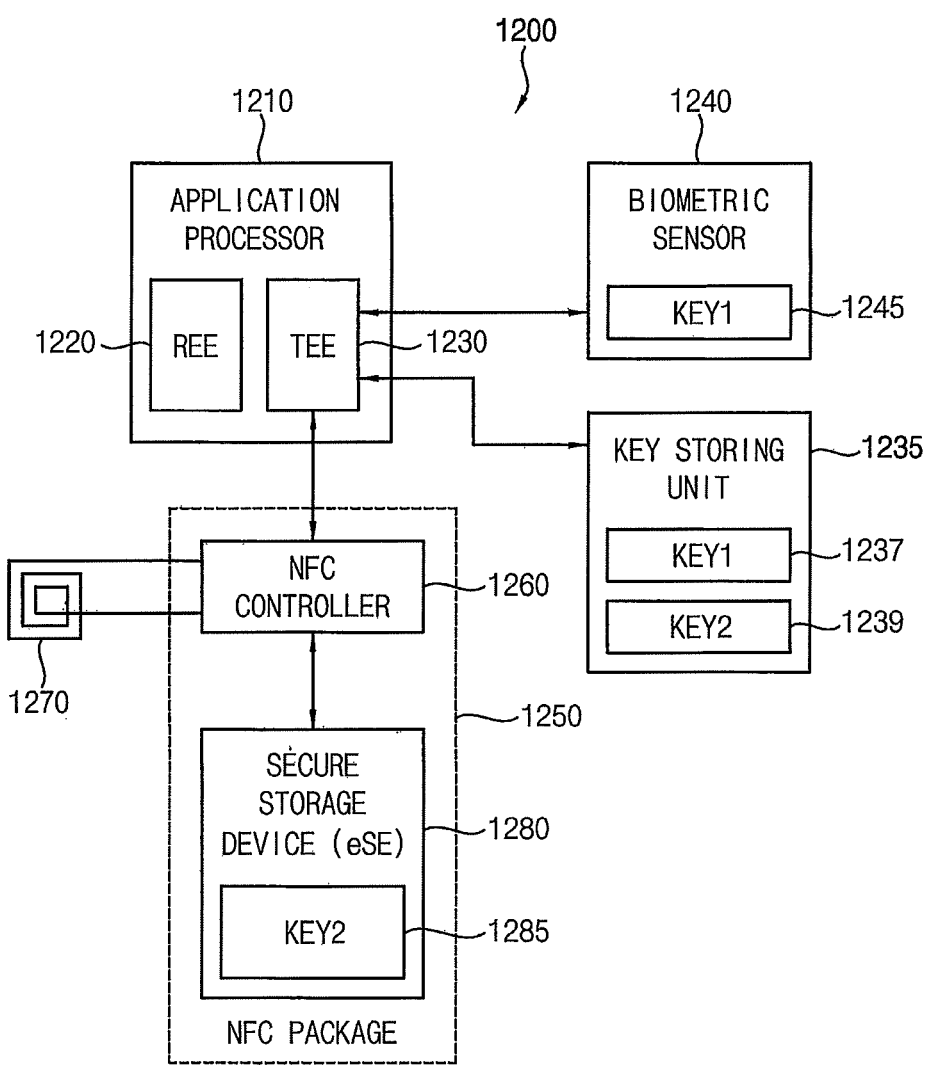
FIG. 11 is a block diagram illustrating an electronic device according to exemplary embodiments.
Figure 12:
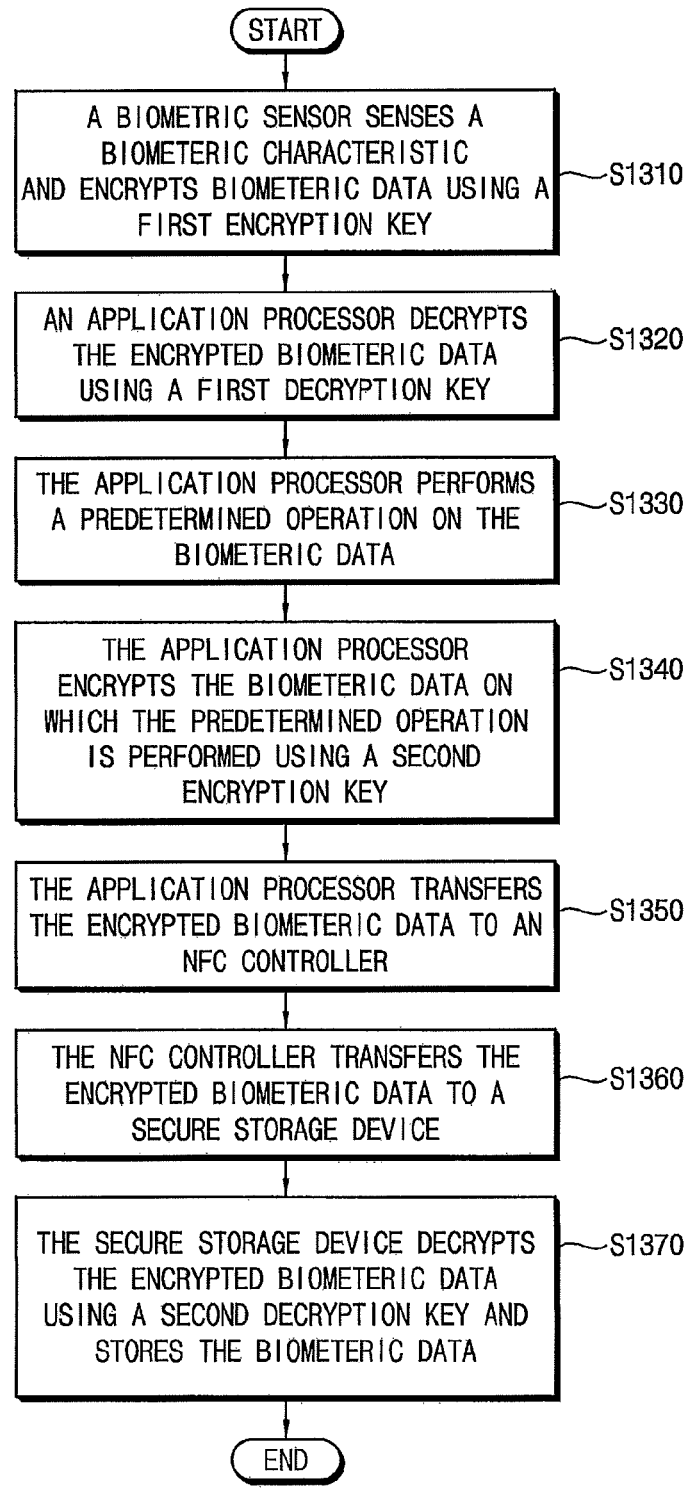
FIG. 12 is a flow chart illustrating a method of storing biometric information in an electronic device according to exemplary embodiments.

FIG. 11 is a block diagram illustrating an electronic device according to exemplary embodiments, and FIG. 12 is a flow chart illustrating a method of storing biometric information in an electronic device according to exemplary embodiments.

Referring to FIG. 11, an electronic device 1200 may include an application processor 1210 that provides an REE 1220 and a TEE 1230, a biometric sensor 1240 that stores a first encryption key 1245, a key storing unit 1235 that stores a first decryption key 1237 corresponding to the first encryption key 1245, and a second encryption key 1239, an NFC controller 1260 connected to an NFC antenna 1270 for a near field communication, and a secure storage device 1280 that stores a second decryption key 1285 corresponding to the second encryption key 1239. The NFC controller 1260 and the secure storage device 1280 may be implemented as an NFC package 1250, for example. The electronic device 1200 of FIG. 11 may have a similar configuration to that of electronic device 400 of FIG. 4. In this exemplary embodiment the electronic device 1200 of FIG. 11 includes the key storing unit 1235 connected to the application processor 1210.

Referring to FIGS. 11 and 12, the biometric sensor 1240 may generate biometric data by sensing a biometric characteristic, and may encrypt the biometric data using the first encryption key 1245 (S1310).

The application processor 1210 may receive the encrypted biometric data from the biometric sensor 1240, and may decrypt the encrypted biometric data using the first decryption key 1237 (for example, the same key as the first encryption key 1245, or the key that is paired with the first encryption key 1245) stored in the key storing unit 1235 (S1320). In some exemplary embodiments, the key storing unit 1235 may be controlled by the TEE 1230, and, as a result, the security for the key storing unit 1235 may be enhanced.

The application processor 1210 may perform a predetermined operation on the biometric data (S1230). For example, the application processor 1210 may process the biometric data (for example, electrocardiogram data, heart rate data, blood pressure data, blood sugar data, etc.) into meaningful heath data (for example, combination of the electrocardiogram, heart rate, blood pressure and/or blood sugar data, or diagnosis data for a health of a user) representing the health of a user.

The application processor 1210 may encrypt the biometric data on which the predetermined operation is performed using the second encryption key 1239 stored in the key storing unit 1235 (S1340), and may transfer the encrypted biometric data to the NFC controller 1260 (S1350). The NFC controller 1260 may transfer the encrypted biometric data, as it is (that is, still encrypted), to the secure storage device 1280 (S1360).

The secure storage device 1280 may store the second decryption key 1285 (for example, the same key as the second encryption key 1239, or the key that is paired with the second encryption key 1239) corresponding to the second encryption key 1239, and may decrypt the encrypted biometric data, on which the predetermined operation is performed, received from the NFC controller 1260 using the second decryption key 1285 (S1370). Thereafter, the electronic device 1200 may transfer the biometric data stored in the secure storage device 1280 to an external health care server, for example.

Figure 13:
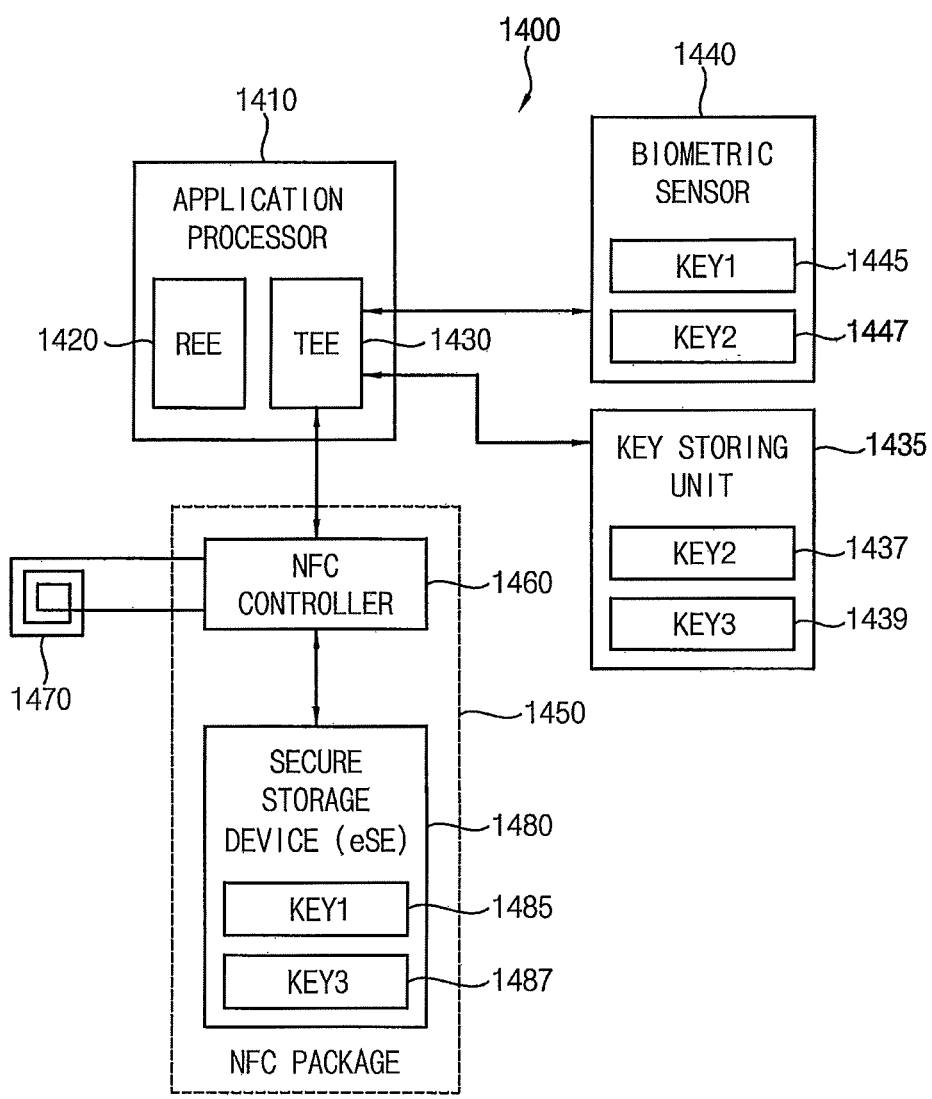
FIG. 13 is a block diagram illustrating an electronic device according to exemplary embodiments.
Figure 14A:
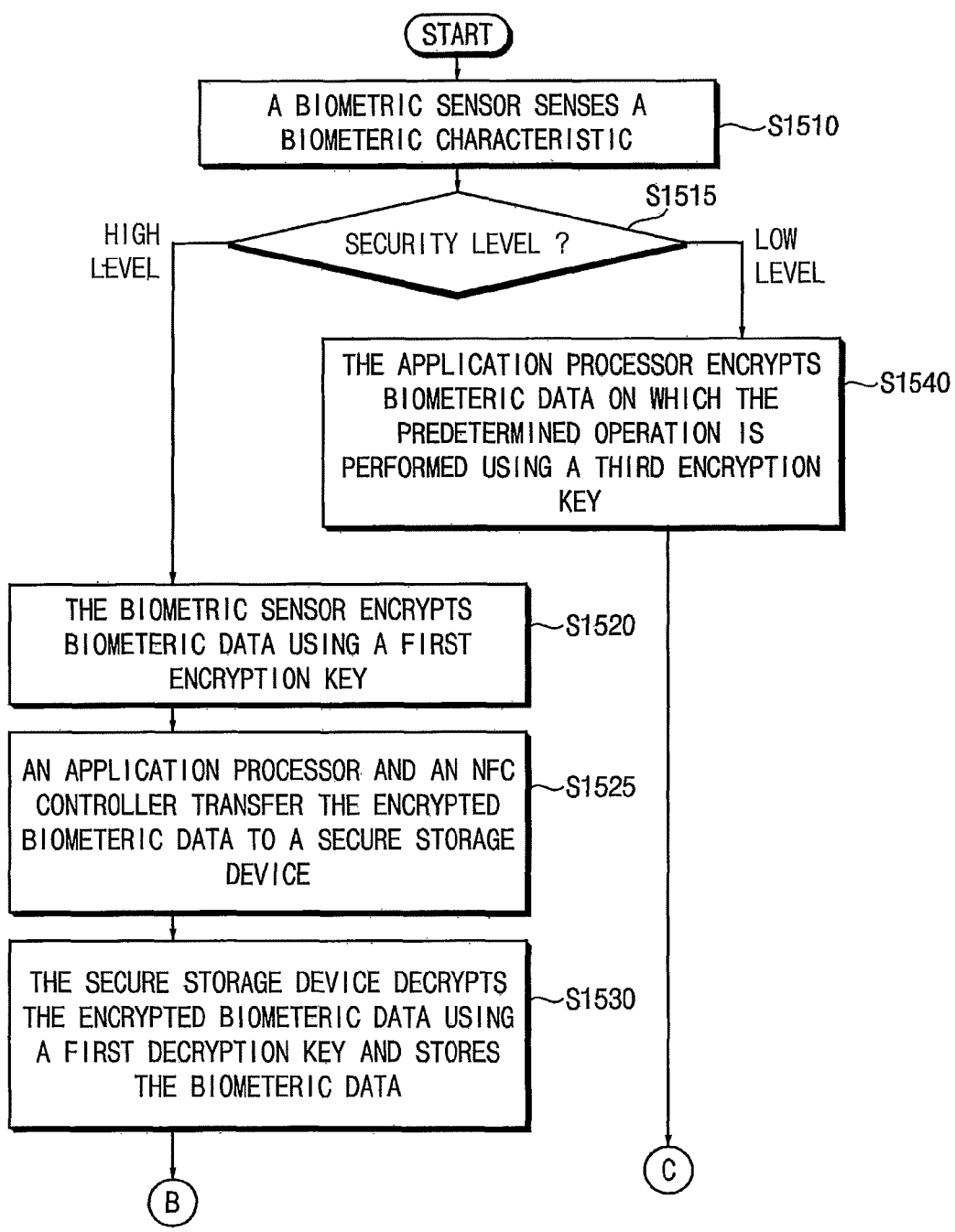
FIGS. 14A and 14B are a flow chart illustrating a method of storing biometric information in an electronic device according to exemplary embodiments.
Figure 14B:
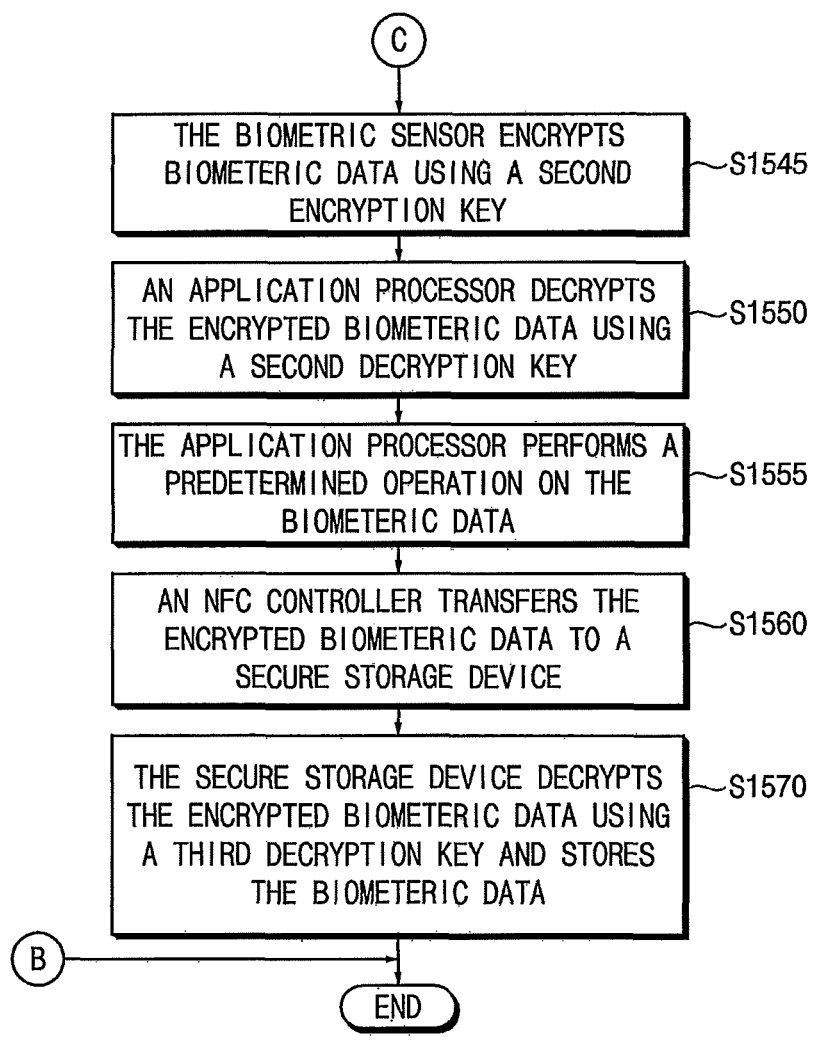

FIG. 13 is a block diagram illustrating an electronic device according to exemplary embodiments, and FIG. 14 is a flow chart illustrating a method in accordance with principles of inventive concepts of storing biometric information in an electronic device according to exemplary embodiments.

Referring to FIG. 13, an electronic device 1400 may include an application processor 1410 that provides an REE 1420 and a TEE 1430, a biometric sensor 1440 that stores a first encryption key 1445 and a second encryption key 1447, a key storing unit 1435 that stores a first decryption key 1437 corresponding to the first encryption key 1445, and a third encryption key 1439, an NFC controller 1460 connected to an NFC antenna 1470 for a near field communication, and a secure storage device 1480 that stores a first decryption key 1485 corresponding to the first encryption key 1445, and a third decryption key 1487 corresponding to the third encryption key 1439. The NFC controller 1460 and the secure storage device 1480 may implemented as an NFC package 1450, for example. The electronic device 1400 of FIG. 13 may have a similar configuration to an electronic device 1200 of FIG. 11. In this exemplary embodiment, encryption and decryption keys 1445, 1447, 1437, 1439, 1485 and 1487 may be employed.

Referring to FIGS. 13 and 14, the biometric sensor 1440 may generate biometric data by sensing a biometric characteristic (S1510). The biometric sensor 1440 may encrypt the biometric data by selectively using the first encryption key 1445 or the second encryption key 1447 according to a security level of the biometric data (or information) (S1515, S1520 and S1540). For example, when the biometric data has a first security level (for example, a high security level) (S1515: HIGH LEVEL), the biometric sensor 1440 may encrypt the biometric data using the first encryption key 1445 (S1520). On the other hand, when the biometric data has a second security level (for example, a low security level) (S1515: LOW LEVEL), the biometric sensor 1440 may encrypt the biometric data using the second encryption key 1447 (S1520).

The biometric data that is encrypted using the first encryption key 1445 may be transferred to the secure storage device 1480 through the application processor 1410 and the NFC controller 1460 (S1525). The secure storage device 1480 may decrypt the encrypted biometric data using the first decryption key 1485 corresponding to the first encryption key 1445, and may store the original biometric data (S1530).

The biometric data that is encrypted using the second encryption key 1447 may be decrypted by the application processor 1410 using the second decryption key 1437 corresponding to the second encryption key 1447 (S1545). The application processor 1410 may perform a predetermined operation or process on the biometric data (S1550). The application processor 1410 may encrypt the biometric data on which the predetermined operation is performed using the third encryption key 1439 (S1555). The biometric data that is encrypted using the third encryption key 1439 may be transferred to the secure storage device 1480 through the NFC controller 1460 (S1560). The secure storage device 1480 may decrypt the encrypted biometric data using the third decryption key 1487 corresponding to the third encryption key 1439, and may store the biometric data on which the predetermined operation is performed (S1570).

As described above, in an electronic device 1400 according to exemplary embodiments, the biometric data encrypted by the biometric sensor 1440 may be selectively decrypted by the application processor 1410 or the secure storage device 1480 according to the security level of the biometric data.

Inventive concepts may be applied to any secure storage device, any NFC package or any mobile device, such as a cellular phone, a smart phone, a wearable device, a tablet computer, a laptop computer, a personal digital assistant (PDA), a portable multimedia player (PMP), a digital camera, a music player, a portable game console, or a navigation device, for example.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of inventive concepts. Accordingly, all such modifications are intended to be included within the scope of inventive concepts as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other embodiments, are intended to be included within the scope of the appended claims.

What is claimed is:

1. An electronic device, comprising:
    a biometric sensor configured to generate biometric data by sensing a biometric characteristic and to encrypt the biometric data;
    an application processor connected to the biometric sensor and configured to control an operation of the electronic device;
    a near field communication (NFC) controller directly connected to the application processor and configured to perform near field communications; and
    a secure storage device directly connected to the NFC controller such that the secure storage device receives encrypted biometric data from the biometric sensor through the application processor and the NFC controller, the secure storage device configured to decrypt and store the biometric data,
    wherein the biometric sensor is configured to store a first encryption key and to encrypt the biometric data using the first encryption key,
    wherein the application processor is configured to store a first decryption key, corresponding to the first encryption key, and a second encryption key, to decrypt the encrypted biometric data using the first decryption key, to perform a predetermined operation on the biometric data, and to encrypt the biometric data upon which the predetermined operation is performed using the second encryption key, and
    wherein the secure storage device is configured to store a second decryption key corresponding to the second encryption key and to decrypt the encrypted biometric data using the second decryption key.

2. The electronic device of claim 1, wherein the secure storage device includes a tamper-resistant function.

3. The electronic device of claim 1, wherein the biometric sensor includes at least one of: a fingerprint sensor that senses fingerprint characteristics as the biometric data, a retina sensor that senses retina characteristics as the biometric data, an iris sensor that senses iris characteristics as the biometric data, a voice sensor that senses voice characteristics as the biometric data, an electrocardiogram sensor that senses heart functioning as the biometric data, a heart rate sensor that senses heart rate functioning as the biometric data, a blood pressure sensor that senses blood pressure as the biometric data, and a blood sugar sensor that senses a blood sugar level as the biometric data.

4. The electronic device of claim 1, wherein the application processor is configured to execute a normal operating system and a secure operating system, and
    wherein the secure operating system is configured to receive encrypted biometric data from the biometric sensor and to transfer the encrypted biometric data to the NFC controller.

5. The electronic device of claim 1, wherein the biometric sensor includes:
    a sensing unit configured to generate biometric data by sensing biometric characteristics;
    a first key storing unit configured to store the first encryption key; and
    a first cryptographic unit configured to encrypt the biometric data using the first encryption key.

6. The electronic device of claim 5, wherein the secure storage device includes:
    a processor configured to control operation of the secure storage device;
    a second key storing unit configured to store the second decryption key corresponding to the second encryption key;
    a second cryptographic unit configured to decrypt the encrypted biometric data using the second decryption key; and
    a secure storing unit configured to store the biometric data.

7. The electronic device of claim 1, wherein the secure storage device is configured to store registered biometric data,
    wherein the secure storage device is configured to obtain current biometric data by decrypting the encrypted biometric data received from the biometric sensor through the application processor and the NFC controller, and
    wherein the secure storage device is configured to compare the current biometric data with the registered biometric data to perform user authentication.

8. The electronic device of claim 7, wherein, when the current biometric data matches the registered biometric data, the electronic device is configured to perform an electronic payment, a unlock operation or a confidential application execution.

9. The electronic device of claim 1, wherein the electronic device is configured to transfer the biometric data stored in the secure storage device to a health care server.

10. An electronic device, comprising:
a biometric sensor configured to generate biometric data by sensing a biometric characteristic and to encrypt the biometric data;
an application processor connected to the biometric sensor and configured to control an operation of the electronic device;
a near field communication (NFC) controller directly connected to the application processor and configured to perform near field communications; and
a secure storage device directly connected to the NFC controller such that the secure storage device receives encrypted biometric data from the biometric sensor through the application processor and the NFC controller, the secure storage device configured to decrypt and store the biometric data,
wherein the biometric sensor is configured to store a first encryption key and a second encryption key,
wherein, when the biometric data has a first security level, the biometric sensor encrypts the biometric data using the first encryption key, and
wherein, when the biometric data has a second security level, the biometric sensor encrypts the biometric data using the second encryption key,
wherein the application processor is configured to store a second decryption key corresponding to the second encryption key, and a third encryption key,
wherein, when the biometric data has the first security level, the application processor is configured to transfer the encrypted biometric data to the NFC controller, and
wherein, when the biometric data has the second security level, the application processor is configured to decrypt the encrypted biometric data using the second decryption key, performs a predetermined operation on the biometric data, and encrypts the biometric data upon which the predetermined operation is performed using the third encryption key.

11. The electronic device of claim 10, wherein the secure storage device is configured to store a first decryption key corresponding to the first encryption key, and a third decryption key corresponding to the third encryption key,
wherein, when the biometric data has the first security level, the secure storage device is configured to decrypt the encrypted biometric data using the first decryption key, and
wherein, when the biometric data has the second security level, the secure storage device is configured to decrypt the encrypted biometric data using the third decryption key.

* * * * *